United States Patent
Jules et al.

(10) Patent No.: US 9,393,699 B1
(45) Date of Patent: Jul. 19, 2016

(54) METHODS AND SYSTEMS FOR WIRELESS CONTROL OF A ROBOTIC DEVICE

(71) Applicant: Google Inc., Mountain View, CA (US)

(72) Inventors: Anthony Sean Jules, Mountain View, CA (US); Aaron Edsinger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/561,850

(22) Filed: Dec. 5, 2014

(51) Int. Cl.
*B25J 9/16* (2006.01)
*B25J 13/00* (2006.01)
*B25J 19/02* (2006.01)

(52) U.S. Cl.
CPC ............... *B25J 13/006* (2013.01); *B25J 19/02* (2013.01)

(58) Field of Classification Search
CPC ....... B25J 9/1689; B25J 11/008; G06F 3/011; G06F 3/017; Y10S 901/01
USPC ............. 700/248, 245, 258; 701/2, 26; 901/1, 901/46; 318/568.1, 568.12, 568.16, 568.25
See application file for complete search history.

(56) References Cited

U.S. PATENT DOCUMENTS

| | | | | |
|---|---|---|---|---|
| 6,189,032 | B1 * | 2/2001 | Susaki | G06F 21/31 709/203 |
| 6,232,735 | B1 * | 5/2001 | Baba | B25J 9/1689 318/567 |
| 8,694,162 | B2 | 4/2014 | Jaynes | |
| 2002/0120362 | A1 * | 8/2002 | Lathan | A63F 13/00 700/245 |
| 2005/0240309 | A1 | 10/2005 | Bischoff | |
| 2012/0316676 | A1 * | 12/2012 | Fouillade | B25J 11/0005 700/246 |
| 2014/0188435 | A1 | 7/2014 | Coombs | |

FOREIGN PATENT DOCUMENTS

WO    WO2014127822 A1    8/2014

* cited by examiner

*Primary Examiner* — Dalena Tran
(74) *Attorney, Agent, or Firm* — McDonnell Boehnen Hulbert & Berghoff LLP (57) ABSTRACT

Methods and systems for wireless control of robotic devices are described herein. As one example of implementing wireless control of a robot, a computing device may provide an alert, such as visual, audio, and/or vibration signals, when the device is capable of engaging in wireless communication with a robot. Prior to engaging the robot, the device may require some gesture of confirmation from the user, such as a passcode, predefined motion, or biometric input, prior to requesting for some amount of control of the robot. After engaging the robot via wireless communication (e.g., near field communication (NFC)), the device may receive control of the robot and enable the user to input control commands. Additionally, in some instances, the device may be configured to receive a subsequent gesture from the user that requests to relinquish control back to a control system of the robot.

19 Claims, 8 Drawing Sheets

METHODS AND SYSTEMS FOR WIRELESS CONTROL OF A ROBOTIC DEVICE

BACKGROUND

Unless otherwise indicated herein, the materials described in this section are not prior art to the claims in this application and are not admitted to be prior art by inclusion in this section.

Robotic systems may be used for various applications, including material handling, welding, assembly, and manufacturing, among others. The increase reliance on robotic systems to complete tasks has led to further developments of robotic devices becoming more efficient and reliable. Different types of robotic devices have been developed, including bipedal, quadruped, and gripping-manufacturing configurations. As different types are developed, a demand for efficient robotic systems has helped open up a field of innovation in robotic system development.

SUMMARY

Examples may relate to wireless control of robotic devices. In some examples, in order to enable the wireless control of one or more robotic devices, a computing device, such as a tablet computer, mobile phone, and/or wearable computing device, may communicate via wireless technology with a robotic device. In particular, the computing device may detect that the robotic device and/or control system of the robotic device is within a desired range to the computing device that enables the computing device to transmit a request and possibly obtain temporary control of the robotic device using near field communication (NFC) technology and/or other wireless communication technology.

In some example implementations, the computing device may be configured to detect one or more gestures from the user prior to establishing communications with the robotic device. The gesture(s) may serve as a confirmation for the computing device to recognize prior to requesting and possibly assuming control of a robotic device. Additionally, in further examples, the computing device may also require the detection of a subsequent gesture by the user at the computing device prior to releasing control of the robotic device back to the robotic device.

In one example, the present application describes a method. The method may comprise providing an alert at a computing device that indicates that the computing device is capable of engaging in wireless communication with a robotic device. Additionally, the method may also include detecting a gesture at the computing device responsive to providing the alert at the computing device, and based on detecting the gesture at the computing device, transmitting a signal requesting at least partial control of the robotic device to the robotic device. Further, the method may also include engaging in control of one or more systems of the robotic device at the computing device responsive to receiving a response signal from the robotic device.

In another example, the present application describes a system. The system may comprise one or more processors and may also include a memory having stored thereon executable instructions that upon execution by the one or more processors cause the system to perform functions. The functions may include providing an alert that indicates that the one or more processors are capable of engaging in wireless communication with a robotic device. In some examples, the alert may include a visual, audio, and/or vibration signal. Additionally, the functions may also include, responsive to providing the alert, detecting a gesture and transmitting a signal requesting at least partial control of the robotic device to the robotic device based on detecting the gesture. Further, the functions may also include engaging in control of one or more systems of the robotic device responsive to receiving a response signal from the robotic device.

In an additional example, the present application describes a non-transitory computer readable medium having stored thereon executable instructions that, upon execution by a computing device, cause the computing device to perform functions. The functions may comprise providing an alert that indicates that the computing device is capable of engaging in wireless communication with the robotic device. The functions may also include, responsive to providing the alert, detecting a gesture, and transmitting a signal requesting at least partial control of the robotic device to the robotic device based on detecting the gesture. Further, the functions may also include, responsive to receiving a response signal from the robotic device, engaging in control of one or more systems of the robotic device.

In another example, a system is provided that comprises a means for wireless control of one or more robotic devices. The system may include means for providing an alert that indicates that the system is capable of engaging in wireless communication with a robotic device. Additionally, the system may include means for detecting a gesture at the system responsive to providing the alert, and means for transmitting a signal requesting at least partial control of the robotic device to the robotic device based on detecting the gesture at the system. Further, the system may also include means for engaging in control of one or more systems of the robotic device responsive to receiving a response signal from the robotic device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A robotic device may perform operations that carry out tasks based on controls provided by a control system of the robotic device. For illustration purposes, the control system of a robotic device may represent any entity controlling the robotic device, such as a system having one or more processors configured to determine and provide instructions to the various subsystems of the robotic device to complete desired tasks. The control system may operate based on information received from sensors and other input interfaces. In some instances, the control system may be physically connected to the robotic device or may operate as a separate physical entity that provides controls to the robotic device through a wired or wireless connection. Additionally, a robotic device may include multiple control systems configured to control different aspects of the robotic device.

Although a control system may be configured to operate a robotic device autonomously without requiring user intervention, some situations may arise in which a user desires some form of control (e.g., temporary control) of the robotic device. For example, a situation may arise that involves a desire from a user to adjust one or more operations of the robotic device for calibration purposes or to attempt a new task. As another example illustration, a user may want to control multiple robotic arms operating within a manufacturing process line. Other examples situations may exist that involve one or more users possibly desiring some amount of control of one or more robotic devices. Regardless of the situation, the user may desire temporary control of the robotic device without having to spend too much time or resources attempting to gain the control.

In some possible examples of implementing wireless control of a robotic device, a user may gain control of one or more robotic devices through using a computing device in a similar manner as a remote control. Although other examples are possible, some example computing device that may be utilized to control robotic devices include a tablet computer, a mobile phone, and/or wearable computing device. Each example computing device may be configured to engage the control system or other controlling component of a robotic device in order to establish a connection and request control.

In some implementations, in order to gain control of a robotic device, the computing device may first search for robotic devices and/or control systems of robotic devices within the area of the computing device. In some instances, the computing device may receive some form of indication when a robotic device or the control system of the robotic device is located nearby the computing device. An example computing device may be configured to detect nearby control systems of robotic devices when a given control system is within a threshold distance to the computing device. The threshold distance may be based on limitations associated with NFC technology implemented within the computing device and control system of the robotic device, and/or may be based on other possible parameters.

After receiving some form of indication that a robotic device or control system of the robotic device is within a possible communication range of the computing device, the computing device may provide an alert, such as a visual alert on a graphical interface (e.g., screen) of the computing device to the user. In some instances, the alert may take various forms and may be configured to inform the user that the computing device may be capable of engaging in wireless communication with the control system of the robotic device. As an example illustration, the alert may include one or more of a visual signal, audio signal, and vibration signal, among other possible alerts. Additionally, in some instances, the computing device may be configured to provide multiple alerts, such as in a situation that the computing device travels nearby multiple control systems of robotic devices. Multiple alerts may vary based on the different robotic devices and/or other possible parameters. For example, the computing device may be configured to provide a drop-down menu via the graphical interface displaying the different options of robotic devices available for controlling. Similarly, the computing device may be configured to provide other graphical interface options for a user to pick which robotic device or devices to establish control with.

After providing one or more alerts indicating nearby robotic devices, the computing device may be configured to wait until detecting a gesture prior to initiating communication with one or more of the robotic devices. For example, the computing device may remain in a sleep state and/or some other form of detection state until detecting a selection of one or more visual icons corresponding to available robots shown on the graphical interface of the computing device by the user prior to sending a request for control to the selected robotic device.

In some instances, the computing device may be configured to detect other possible gestures as well. For example, the computing device may wait until detecting a passcode or a biometric input as confirmation that the user wants the computing device to initiate an assumption of control process with one or more robotic systems. In another example, the computing device may require the detection of the user moving the computing device in a predefined motion prior to requesting control of a robotic device. As such, the computing device may include components that enable these gestures as well as other possible gestures.

As a result of detecting some gesture designated by the computing device as an approval from the user, the computing device may transmit a signal requesting some form or amount of control of the robotic device to the robotic device (e.g., to the control system of the robotic device). In some instances, the computing device may transmit multiple signals to multiple robotic devices as a result of detecting a selection of multiple available robotic devices by the user. After transmitting some form of communication (e.g., signal) to the control system of a robotic device, the computing device may wait until receiving confirmation from one or more systems of the robotic device that provides some form of control of the robotic device to the computing device. After obtaining control of the robotic device, the computing device may serve as a remote control that enables the user to have some degree of control of the robotic device. In some instances, the robotic devices may be configured to instantly provide control to the computing device upon the initial NFC or other form of connection between the control system and the computing device. Other examples of control handoff between the multiple devices may exist.

The computing device may use various options for communicating with the robotic device. For example, the computing device may use NFC technology to establish communication with the robotic device, including requesting and receiving control from the robotic device. Additionally, the computing device may also switch between wireless communications technologies when initiating communication and controlling a robotic device. For example, the computing device may establish the initial connection with the control system of a robotic device via NFC technology, but may switch to a Wi-Fi connection to maintain control of the robotic device across distances that NFC may not efficiently enable. Other examples of wireless connections between the computing device and one or more control systems of robotic devices may exist.

Furthermore, in some examples, the computing device may also be configured to require the detection of a subsequent gesture or gestures from the user prior to providing assumed control of a robotic device back to a control system of the robotic device. For example, the computing device may remain in control of the robotic device via user inputs until detecting the same gesture from the user that alerted to the computing device to request control initially. In some examples, the subsequent gesture(s) may differ from the initial gesture so that the computing device may limit accidently transferring control back to the control system of the robotic device. For example, the initial gesture may be the detection of a motion of the computing device by one or more sensors of the computing device and the subsequent gesture may be the input of a passcode. Other possible gestures may be used within examples.

Additionally, the computing device may be configured to provide a user with various options relating to engaging in control of the robotic device. For example, the computing device may provide the user with an option to define a timer that limits the duration of time that the computing device remains in control of a robotic device after initially establishing control. After the timer runs out, the computing device may be configured to automatically transfer control back to the control system of the robotic device. Similarly, in other possible examples, the computing device may provide other possible customizations that enable the user to efficiently and accurately control robotic devices. For example, the computing device may return control of the robotic device back to the robotic device upon losing wireless connection with the robotic device above a threshold time limit (e.g., 5 seconds).

Figure 1:
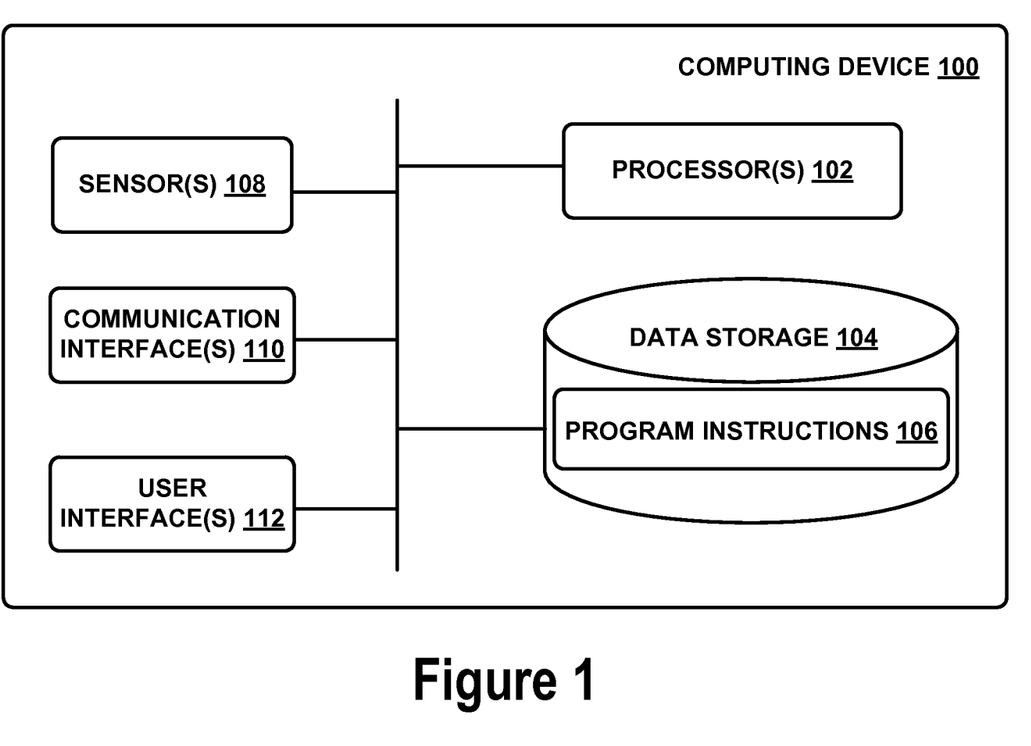
FIG. 1 is a simplified block diagram of an example computing device.

Referring now to the Figures, FIG. 1 is a simplified block diagram of an example computing device. Representing one of many possible example configurations of computing devices, the block diagram of computing device 100 illustrates an example computing device configured to perform at least the operations described herein. As such, computing device 100 may exist in various forms including, but not limited to, a mobile phone, wearable computing device, motion controls, or tablet computing. Furthermore, computing device 100 may also be referred to herein as a computer, phone, wearable computing device, device, or tablet, etc.

As shown in FIG. 1, computing device 100 includes processor(s) 102, data storage 104, program instructions 106, sensor(s) 108, communication interface(s) 110, and user interface(s) 112. Computing device 100 is shown for illustration purposes having the components listed above, but may include more or less components than shown in FIG. 1 in other examples. In addition, the various components of computing device 100 may be connected in any manner, including wired or wireless connections, etc. Furthermore, in some examples, components of computing device 100 may be positioned on multiple entities rather than on a single entity. Other configurations of computing device 100 may exist.

As indicated, computing device 100 may include processor(s) 102. Processor(s) 102 may operate as general-purpose processor(s) or a special purpose processor(s) (e.g., digital signal processors, application specific integrated circuits, etc.). Furthermore, processor(s) 102 can be configured to execute computer-readable program instructions 106 that are stored in the data storage 104. Computing device 100 may include one or more processors within examples.

Data storage 104 may exist as any one or more various types of storage configured to hold memory. For example, data storage 104 may include or take the form of one or more non-transitory computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, data storage 104 may be a single physical device (e.g., one optical, magnetic, organic or other memory or disc storage unit). In other example implementations, data storage 104 can be implemented using two or more physical devices, which may communicate via wired or wireless communication. Further, in addition to the non-transitory computer-readable program instructions 106, data storage 104 may include additional data such as diagnostic data, among other possibilities.

Computing device 100 may include various sensor(s) 108, such as force sensor(s), proximity sensor(s), motion sensor(s), position sensor(s), and touch sensor(s), among other possibilities. Sensor(s) 108 may be configured to measure motion, orientation, and various environmental conditions. As such, the different types of sensors may be configured to provide raw data with high precision and accuracy to processor(s) 102 and/or other components of computing device 100. Furthermore, sensor(s) 108 may be configured to capture and provide information to one or more users.

As indicated, computing device 100 may include one or more motion sensors configured to measure parameters, such as acceleration forces and rotational forces along possible axes (e.g., three axes). Motion sensors may include accelerometer(s), gravity sensor(s), gyroscope(s), and/or rotation vector sensor(s), among other possible sensors. Furthermore, computing device 100 may include environmental sensors configured to measure various environmental parameters, such as ambient air temperature and pressure, illumination, and humidity. Some example environmental sensors include barometers, photometers, and thermometers. Position sensors may measure the physical position of computing device 100 and may include orientation sensors, magnetometers, and/or other possible sensors. As indicated above, computing device 100 may include other types of sensors as well.

Communication interface(s) 110 may include one or more components configured to enable communication with other devices. In particular, communication interface(s) 110 may enable communication with mobile phones, computing devices, servers, control systems, and/or robotic devices, among other possibilities. Communication interface(s) 110 may include respective components configured to send/receive data between devices and may further maintain and mange records of data sent/received. Communication interface(s) 110 may also enable the computing device 100 to establish wired (e.g., USB connections) or wireless connections. The wireless connections may involve using one or more of various technologies, such as Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In addition, communication interface(s) 110 may include near field communication (NFC) technology. NFC is a set of short-range wireless technologies, which may operate based on a threshold distance (e.g., 2 to 3 feet) to initiate a connection. NFC technology may enable computing device 100 to initiate and establish communications with other devices, servers, control systems, robotic devices, and/or other entities having NFC capability. NFC may allow computing device 100 to share small payloads of data with other computing devices. Furthermore, computing device 100 may interact with other devices via a "cloud" network, which enables computing devices to communicate wirelessly.

Computing device 100 may include user interface(s) 112 configured to enable a user to operate computing device 100. Among possible examples, user interface(s) 112 may include buttons, a touchscreen, a microphone, camera, motion sensors, and/or any other elements for receiving inputs. In some examples, the computing device 100 may include a speech recognition module that include voice user interface(s) 112, such as search, call routing, voice dialing, simple data entry, document preparation, and/or speech-to-text processing, for example. Additionally, computing device may also include various components for providing outputs to a user and/or other devices, such as speakers, graphical interfaces, etc.

Figure 2:
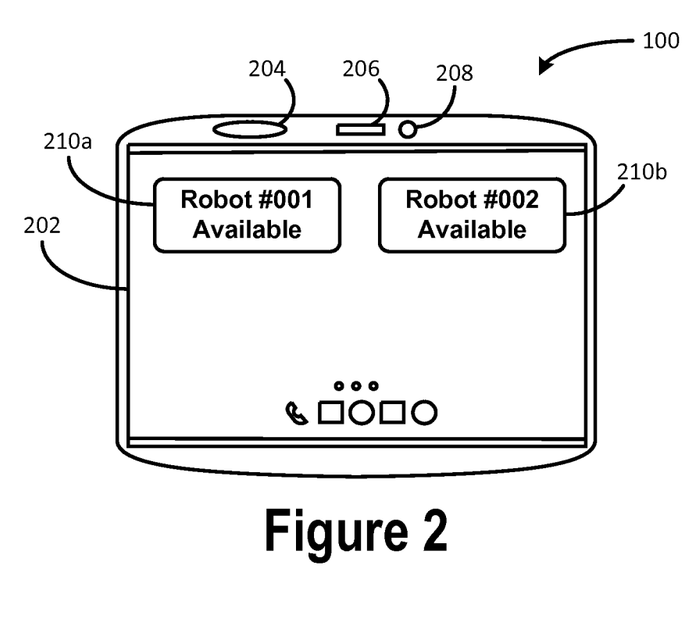
FIG. 2 illustrates a computing device, according to an example implementation.

FIG. 2 illustrates a computing device, according to an example implementation. In particular, FIG. 2 may illustrate a physical representation of the block diagram of computing device 100 shown in FIG. 1. Additionally, computing device 100 may exist in other configurations other than the physical representation shown in FIG. 2. As illustrated in FIG. 2, computing device 100 includes a graphical interface 202, biometric input interface 204, microphone 206, and camera 208. In other examples, an illustration of computing device 100 may include more or less components, including possibly having components located across multiple entities.

Computing device 100 includes graphical interface 202 for displaying visual alerts, applications, and/or other information. Graphical interface 202 may provide video and may be interactive with the touchscreen ability. In the example shown in FIG. 2, graphical interface 202 may display visual alerts that indicate when a possible connection with a robotic device is available. In particular, graphical interface 202 is displaying robot icons 210a-210b (e.g., alerts) that represents possible alerts for informing the user that computing device 100 may establish communications with one or both of robot #001 and robot #002. By way of example, a user may select one, both, or none of the robot icons 210a-210b using touch screen technology and/or some other form of interface that enables selection. For example, other possibilities for selecting robotic icon(s) 210a-210b may include vocal selection using voice recognition technology, detection of a motion selection, retina selection technology, among others. Additionally, graphical interface 202 may display alerts in other ways than shown in FIG. 2.

Furthermore, graphical interface 202 may provide virtual buttons and/or other controls for a user to input commands to control a robotic device. For example, graphical interface 202 may appear as a visual representation similar to a generic videogame controller when computing device 100 permits control of a robotic device by a user. Similarly, computing device 100 may include hardware that enables user inputs as well. Example hardware may include buttons, joysticks, grip sensors, etc.

Biometric input interface 204 may include one or more types of interfaces capable of receiving biometric inputs from a user. In some examples, biometric input interface 204 may include one or more components configured to serve as access control for computing device 100. The components may be configured to identify biometrics or measurable characteristics associated with particular users. As such, biometric input interface 204 may serve as possible technology that enables computing device 100 to restore settings configured by particular users. Additionally, biometric input interface 204 may provide additional security for computing device 100.

Different types of biometric input interface 204 may be configured to operate for computing device 100. Examples include, but are not limited to technology to measure fingerprints, palm veins, face recognition, DNA, palm print, hand geometry, iris recognition, retina, and/or scent detection.

Microphone 206 may enable computing device 100 to receive audio input from one or more sources, including commands from users. Microphone 206 may further allow computing device 100 to capture vocal information from a user for voice recognition purposes, which may include measuring rhythm, gait, and/or voice. In some examples, computing device 100 may include one or more microphones configured to receive inputs, including instructions relating to selecting and taking control over one or more robotic devices. Microphone 206 may perform other operations within examples.

Camera 208 may operate to capture visual inputs from a user, including visual detection of motion inputs. In some examples, computing device 100 may include one or more cameras, which may include cameras configured to capture depth information. Computing device 100 may be configured to use one or more cameras to capture information about the environment, time of day, and/or other possible information. Camera 208 may serve as a possible input device that enables a user to command a robot or provide other inputs via motions.

Figure 3:
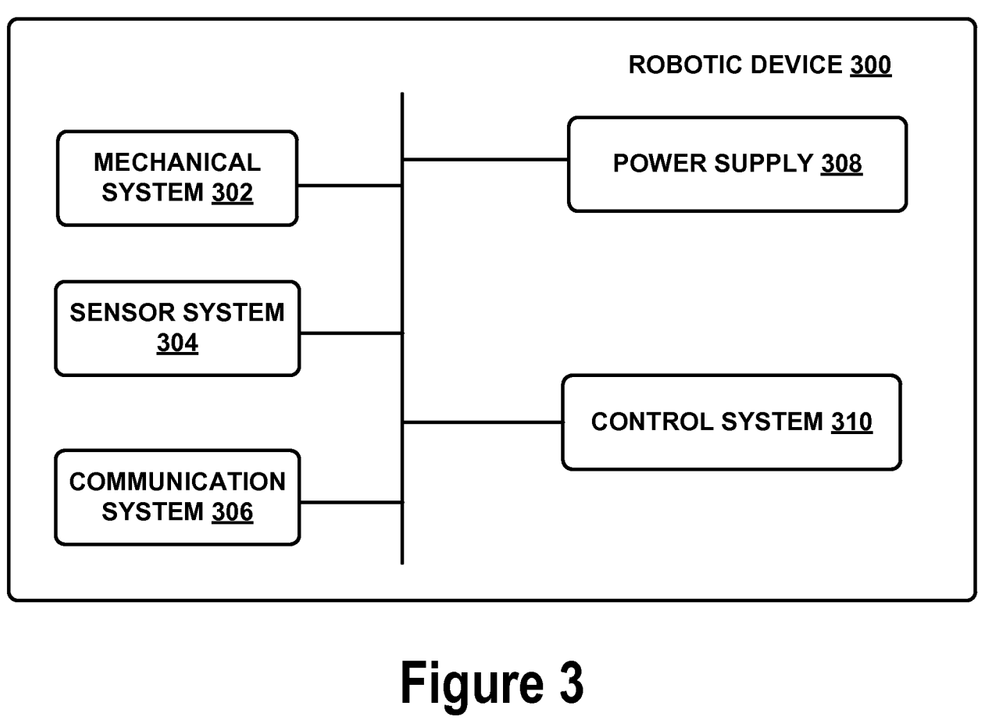
FIG. 3 is a simplified block diagram of an example robotic device.

FIG. 3 is a simplified block diagram of an example robotic device. In particular, the block diagram of robotic device 300 represents an example robotic system configured to perform at least the operations described herein. In some examples, robotic device 300 may be configured to operate autonomously, semi-autonomously, and/or by enabling control by user(s) through various interfaces. Additionally, robotic device 300 may exist in various physical forms including, but not limited to, a manipulating arm configuration, humanoid robot, or quadruped robot configuration, among other possible example configurations. Moreover, robotic device 300 may also be referred herein as other possible labels, such as a robotic device, mobile robot, or robot, etc.

As illustrated in FIG. 3, robotic device 300 may be configured to include various subsystems, such as a mechanical system 302, a sensor system 304, a communication system 306, a power supply system 308, and a control system 310. In other examples, robotic system 300 may include more or fewer subsystems, and each subsystem could include multiple components. Furthermore, the subsystems and the components within the subsystems may be interconnected via various types of connections, including wireless and/or wired connections.

Mechanical system 302 may include various components that enable robotic device 300 to perform operations, including, but not limited to a body, legs, arms, joints, grippers, wheels, a base, manipulators, etc. The various mechanical and/or electrical components may be interconnected to enable robotic system 300 to perform operations relating to various tasks. For example, a gripper may connect to an arm that connects to the base of robotic system 300 using various types of joints and links to enable operation in varying degrees of freedom. In addition, mechanical system 302 may include one or more motors to enable the components of mechanical system 302 to perform the operations. Different components may be interconnected using joints and/or other types of connections that permit desired degrees of freedom.

Sensor system 304 may include one or more sensors configured to detect information about the environment and operations of components of mechanical system 302 of robotic system 300. One or more sensors may be connected to various components of mechanical system 302 of robotic system 300. Sensor system 304 may use one or more bodymounted sensors, including two-dimensional (2D) sensor(s) and/or three-dimensional (3D) depth sensors to obtain information about the surrounding environment of robotic system 300. Sensors may couple to other components of mechanical system 302, such as to grippers to measure parameters associated with grip operations. Sensors may assist robotic system 300 carry out tasks, including providing alerts relating to proximity of components relative to objects or contact sensors.

Sensor system 304 may include an inertial measurement unit (IMU), which may include an accelerometer and/or gyroscope, among other possible sensors. The IMU may be configured to determine an orientation, position, velocity, and/or acceleration of robotic system 300. Additionally, in some examples, different mechanical components may include an IMU to enable monitoring of parameters associated with the respective mechanical components. As such, an accelerometer may measure the orientation of one or more components of robotic system 300 with respective to gravity, while a gyroscope may measure the rate of rotation around an axis of respective component(s). Different types of IMU components may be used, such as a miniaturized MicroElectroMechanical System (MEMS) or a NanoElectroMechanical System (NEMS). Furthermore, sensor system 304 may include other types of sensors, such magnetometers and pressure sensors, among possibilities.

Communication system 306 may include one or more components that enable robotic system 300 to communicate with other devices. Communication system 306 may include different types of communication interfaces, including wireless communication technologies, such as NFC technology. As such, communication system 306 may allow robotic device 300 to communicate with other devices, servers, including enabling the ability for communication system 306 to send and receive information. In some examples, communication system 306 may include technology that enables the control system(s) of robotic device 300 to communicate with other devices across a "cloud" network. Other components may exist within communication system 306.

Power supply 308 may include various types of power sources configured to provide power to components of robotic system 300. Power supply may include electric sources, such as a rechargeable lithium-ion or lead-acid battery, for example. Power supply 308 may include a hydraulic system, a pneumatic system, solar power, and/or banks of batteries, for example. Other power supply materials and types are also possible. Additionally, in some examples, power supply 308 may include components that enable robotic device 300 to provide power to external devices, such as computing device 100, for example.

Control system 310 may be one or more components configured to control operations of robotic system 300. As such, control system 310 may include one or more computing devices configured to control different operations of robotic system 300. The one or more computing devices within control system 310 may include one or more processors, data storage, and instructions (e.g., program logic), among other possible computational components. Additionally, the one or more processors may include one or more microprocessors.

As indicated, control system 310 may include various types of memory, which may include instructions executable by the one or more processors to execute various functions of robotic system 300, including functions described herein. The memory may include additional instructions, including instructions to transmit/receive data, interact with, and/or control one or more of mechanical system 302, sensor system 304, communication system 306, and power supply 308.

In some instances, control system 310 may receive information from sensor system 304 to determine operations for controlling components of mechanical system 302. Control system 310 may be located on and/or in robotic system 300 or may be physically separate from robotic system 300. Control system 310 may utilize one or more components of communication system 306 to control operations of robotic device 300. As such, control system 310 may control robotic system 300 through wired or wireless communication.

Control system 310 may be configured to communicate with other devices through communication system 306, including through NFC technology. For example, control system 310 may engage in signaling and/or other forms of communication with computing device 100 through various wired and/or wireless technologies, such as NFC.

Figure 4:
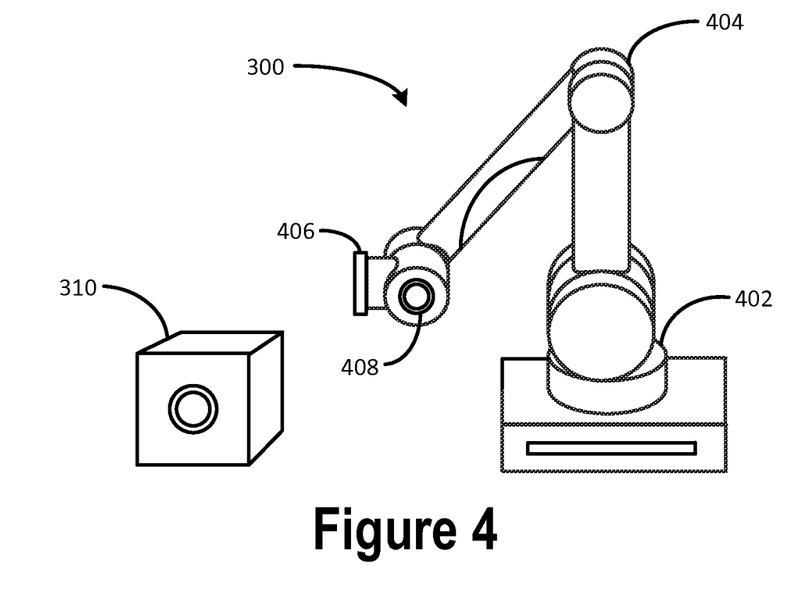
FIG. 4 illustrates a robotic device, according to an example implementation.

FIG. 4 illustrates a robotic device, according to an example implementation. In particular, FIG. 4 shows one possible physical representation of robotic device 300 described in FIG. 3. However, as one skilled in the art would recognize, robotic device 300 may exist in other possible forms and/or configurations within other example implementations, including but not limited to quadruped or bipedal configurations. As previously indicated, robotic device 300 may be configured to perform operations described herein as well as other possible operations. For example, robotic device 300 may be configured to carry out various tasks relating to manufacturing, storage, and/or assembly.

Furthermore, as shown in FIG. 4, control system 310 configured to control one or more operations of robotic device 300 is positioned as a separate entity physically separate from robotic device 300. However, in other examples, control system 310 may be physically connected to robotic device 300 at various positions (e.g., base) and/or may be positioned inside one or more components of robotic device 300.

Robotic device 300 is shown in FIG. 4 having various components, including a base 402, mechanical joint 404, and mechanical gripper 406, and LED ring 408. In addition, robotic device 300 may include more or less components within examples.

Base 402 may serve as support for robotic device 300 and enable rotation and movement of robotic device 300 within an environment. Base 402 may be configured using various materials and may enable robotic device 300 to perform different operations. Other components of robotic device 300 may connect to base 402 as a center of gravity point for robotic device 300.

In addition, components may connect using various types of connections, such as mechanical joint 404, which may enable components of robotic device 300 to move in various controlled degrees of freedom. As such, robotic device 300 may include multiple mechanical joints positioned at different component connecting points to enable efficient movement during operations. Furthermore, robotic device 300 may include one or more manipulators or grippers, such as mechanical gripper 406 positioned near the end of the arm of robotic device 300. The various manipulators and/or gripper may perform various operations (e.g., grip operations) and may have different positions within other examples configurations. As such, robotic device 300 may include various types of mechanical grippers depending on the design and purpose of robotic device within other examples.

LED ring 408 may serve as a visual indication for user that robotic device 300 is operating properly. In some examples, LED ring 408 may change colors to indicate parameters associated with the robotic device 300. In some instances, LED ring 408 may change settings (e.g., color) based on whether the control system of robotic device 300 is controlling the robotic device 300 or whether another device has control. In addition, LED ring 408 may represent other parameters, such as when robotic device 300 is communicating with another device (e.g., computing device 100). As such, LED ring 408 may assist the user recognize when the computing device 100 is communicating with robotic device 300. Other example uses of LED ring 408 may exist.

Figure 5:
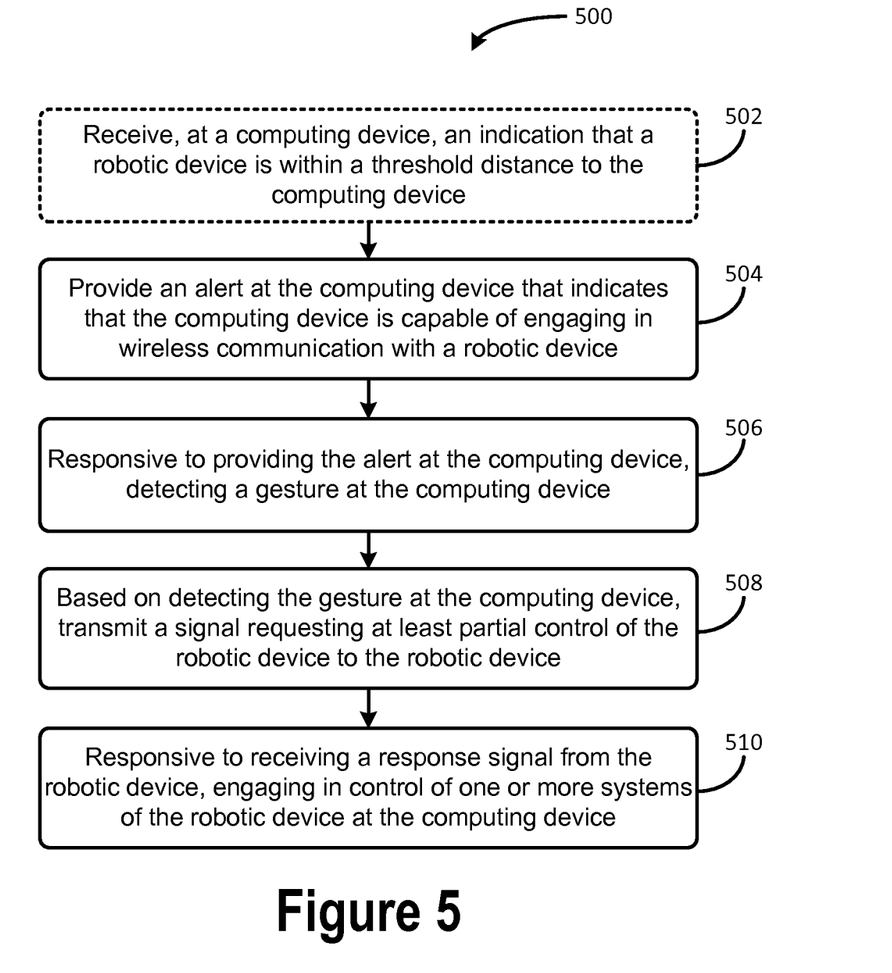
FIG. 5 is a flowchart for engaging in wireless control of a robotic device, according to an example implementation.

FIG. 5 is a flowchart for engaging in wireless control of a robotic device, according to an example implementation. The flowchart 500 may include one or more operations, or actions as illustrated by one or more blocks 502-510. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, the flow chart shows functionality and operation of possible implementations of present implementations. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM).

The computer readable medium may also include non-transitory media or memory, such as secondary or persistent long term storage, like read only memory (ROM), optical or magnetic disks, compact-disc read only memory (CD-ROM), for example. The computer readable media may also include any other volatile or non-volatile storage system. The computer readable medium may be considered a computer readable storage medium, a tangible storage device, or other article of manufacture, for example.

The non-transitory computer readable medium could also be distributed among multiple data storage elements, which could be remotely located from each other. A computing device or control system that executes some or all of the stored instructions could be any type of computing device, such as the example computing device 100 shown in FIG. 1, respectively. Alternatively, the computing device or system that executes some or all of the stored instructions could be another computing device or system, such as a server. In addition, each block in FIG. 5 may represent circuitry that is wired to perform the specific logical functions in the process.

Various types of computing devices may be configured to execute method 500 or similar methods to implement wireless control of one or more robotic devices. For illustration purposes, example computing device 100 shown in FIGS. 1-2 is described as performing one or more of the blocks of method 500.

At block 502, method 500 may optionally include receiving, at a computing device, an indication that a robotic device is within a threshold distance to the computing device. In some examples, method 500 may include blocks 504-510 without including block 502.

As a computing device (e.g., computing device 100) changes position throughout an environment, the computing device 100 may actively scan the area for robotic devices. For example, a user may carry computing device 100 throughout a factory that includes different robotic devices configured to carry out tasks. Computing device 100 may detect and/or otherwise receive some form of indication that robotic devices are located nearby. As such, computing device 100 may enable the user to use a single computing device rather than multiple computing devices with one for each robotic device.

In some implementations, computing device 100 may be configured to specifically search for control systems and/or other components capable of handing over control of a robotic device rather than scanning for the robotic device itself. Searching for control systems may benefit the computing device 100 in cases that the control system is physically separate from the robotic device (e.g., the control system is located in a control room away from the operating floor containing the robotic devices). Similarly, computing device 100 may be configured to search for robotic devices within the environment.

As indicated, computing device 100 may detect the presence of robotic devices and/or components of robotic devices (e.g., control systems) within the environment, which may involve using various sensors, wireless communication technologies, and/or other possible processes. As shown in FIGS. 1-2, computing device 100 may include a variety of sensors configured to receive information indicative of the environment, including detecting nearby robotic devices. As one example illustration, computing device 100 may utilize maps of the environment along with a global positioning system (GPS) module to identify nearby robotic devices. Similarly, computing device 100 may detect robotic devices and/or control systems via Wi-Fi technology and/or other possible sensors. Robotic devices and computing device 100 may be configured to communicate via wireless pings, for example.

The indications received by computing device 100 may vary in examples. In some instances, the indication may provide information relating to a location, connection process, and/or other parameters associated with the control system to computing device 100. In other cases, computing device 100 may merely receive an indication during initial communication with the robotic device during wireless communication, such as the initial transfer of information using NFC technology. For example, computing device 100 may require a user to recognize the presence and location of the control system of the robotic device in order to come within proper range for establishing transfer of control of the robotic device.

In one example implementation, NFC technology associated with computing device 100 and the robotic device (e.g., control system 310 with robotic device 300) may limit the distance at which the computing device 100 and robotic device 300 may communicate. NFC technology may require computing device 100 to be placed nearby or touch the control system 310 or other components of robotic device 300 in order for computing device 100 to recognize a possibility of obtaining control of robotic device 300 and/or to cause computing device 100 to receive some form of control. As such, the user may provide an indication to computing device 100 indicating that computing device 100 should attempt to establish a connection with a nearby robotic device.

At block 504, method 500 may include providing an alert at the computing device that indicates that the computing device is capable of engaging in wireless communication with a robotic device. As previously shown, computing device 100 may be optionally configured to recognize and/or detect the presence of a control system of a robotic device. In some instances, the computing device 100 may need to be within a threshold distance from the control system in order to have the ability to establish communication with the threshold distance possibly depending on the communication technology used to perform the handover of control. For example, the threshold distance may be based on NFC technology and/or other technology establishing communication between the computing device 100 and control system.

Similarly, computing device 100 may be configured to initiate a control process of a robotic device in other ways. For example, computing device 100 may receive an input from a user that indicates that computing device 100 should start detecting robotic devices available for engaging in wireless control. Computing device 100 may exist in various modes, including a mode that enables receiving a gesture for attempting to obtain control of a robotic device from a user. Computing device 100 may be configured to receive authentication from a user that confirms that the user can obtain control of a robotic device using computing device 100. In some instances, computing device 100 may be configured to have other initial steps to start engaging a robotic device for engaging in control of the robotic device.

Robotic device 100 may be configured to provide alerts indicating the presence of robotic devices and/or associated control systems of the robotic devices. In particular, the alert(s) may signal that the computing device is capable of engaging in wireless communication with the robotic device. As an example illustration, computing device 100 may provide an alert when control system 310 of robotic device 300 is within the threshold distance permitted by NFC technology.

The alerts may include various parameters and may vary within examples. In some examples, the computing device 100 may provide a visual alert via a graphical interface, such as the visual alerts shown in FIG. 2. For example, the computing device may provide an icon, a visual rendering of a robot, or some other visual cue that indicates that the computing device may communicate with the control system of the robotic device. As such, the computing device 100 may provide various visual alerts in some instances. Additionally, the computing device may provide alerts specific for a given robotic device, such as a robotic identification number that is associated with the given robotic device.

Furthermore, computing device 100 may provide an audio and/or vibration alerts to inform a user that a control system of a robotic device is within range of the computing device. In some examples, different sounds and/or vibrations may associate with different robotic devices. As such, a user may recognize that computing device 100 may connect with a particular robotic device based on the sound, vibration, and/or other alert provided. Other types of alerts may exist within examples. The computing device 100 may be configured to perform one or more alerts of a variety of possible alerts in examples. In addition, in some instances, the computing device 100 may be configured to not provide any form of alert at all.

At block 506, method 500 may include, responsive to providing the alert at the computing device, detecting a gesture at the computing device. Regardless of whether or not computing device 100 provided some alert to the user, computing device 100 may be configured to detect one or more gestures from the user that indicate that the user wants the computing device to initiate some form of communication with the control system of the robotic device. As such, the computing device 100 may confirm that the user desires some portion of control of the robotic device.

Computing device 100 may be configured to detect different gestures within examples. Additionally, in some instances, the computing device 100 may be configured to not require any gesture or a specific gesture at all. Example of gestures may include the detection of an entry of a passcode (e.g., predefined alphanumeric code) or biometric input by the user at the computing device 100 and/or detecting a predefined motion of the computing device 100 caused by the user, among other possible gestures. In some examples, computing device 100 may accept vocal gestures, among other possibilities.

In an example illustration, the gesture may be a predefined motion and the computing device 100 may detect the predefined motion using one or more sensors, such as an accelerometer and/or gyroscope. Similarly, as indicated above, the computing device 100 may be configured to detect a passcode gesture. For example, the computing device may initiate the connection process with a control system of a robotic device after detecting an entry of a predefined passcode, such as an alphanumeric entry, etc. As such, computing device 100 may securely prohibit unauthorized access to contents of computing device 100.

In other examples, the computing device 100 may be configured to detect a selection of one or more robotic icons provided on the graphical interface by the user prior to communicating with the selected robotic device. Further, in another example, computing device 100 may be configured to start communication with a control system of a robotic device after detecting a biometric input from a user. As previously shown, computing device 100 may use a fingerprint scanner, facial recognition, and/or other forms of biometric inputs as confirmation from a user to attempt to obtain control of one or more robotic devices. Example computing devices may be configured to accept other possible gestures. In some instances, the computing device may be configured to require the detection of multiple gestures prior to initiating communication with the robotic device.

Furthermore, in some instances, computing device 100 may be configured to require the detection of one or more gestures after establishing initial communication with the control system of the robotic device. For example, computing device 100 may connect with the control system of the robotic device via NFC technology and require the entry of a particular gesture or gestures from the user prior to allowing the user input controls to the robotic device. In this example, computing device 100 may gain some amount of control of the robotic device from the control system and then require the gestures as a confirmation that the user is capable or allowed to input controls. Other time variations for requiring the gesture may exist in examples.

In one example implementation, the computing device 100 may be configured to detect movement of the computing device 100 towards the robotic device (e.g., robotic arm) and/or control system of the robotic device. Detecting the movement of the computing device 100 may involve using the IMU (e.g., accelerometer) of the computing device 100 and the computing device 100 may detect the movement as qualifying for the gesture.

At block 508, method 500 may include, based on detecting the gesture at the computing device, transmitting a signal requesting at least partial control of the robotic device to the robotic device. As previously described, computing device 100 may be configured to detect some gesture from the user prior to initiating a request for control of the robotic device. After receiving the gesture, the computing device 100 may confirm that the gesture is proper and proceed by transmitting a signal requesting some form of control to the robotic device. For example, computing device 100 may transmit a signal via NFC technology to the robotic device 300 and/or the control system 310 of robotic device 300 to request some extent of control of robotic device 300 from control system 310.

Additionally, parameters associated with requesting control from the control system by the computing device may vary in some examples. For example, the computing device 100 may send encrypted data to the control system that includes a request for some amount of control. Other communications between the computing device 100 and control system of the robotic device may exist.

In some instances, computing device 100 may communicate wirelessly with control system 310 requesting control without making physical contact. The distance between the computing device and the control system may vary and may further be based on the type of technology used to enable the communication. In another example implementation, computing device may transmit the signal to control system 310 using NFC technology after computing device 100 physically touches control system 310. For example, computing device 100 may communicate with control system 310 after the user taps computing device 100 on control system 310.

Furthermore, as previously indicated, computing device 100 may be configured to gain control of the robotic device prior to receiving a gesture confirmation from the user. In some instances, the computing device 100 may gain control simply based on the distance between the computing device 100 and the robotic device without requiring any gestures from the user.

At block 510, method 500 may further include, responsive to receiving a response signal from the robotic device, engaging in control of one or more systems of the robotic device at the computing device. After transmitting the signal requesting control of robotic device 300 to robotic device 300, computing device 100 may receive control or partial control of robotic device 300 via a response signal received from robotic device 300. The computing device 100 may control the robotic device and may provide some amount of control to the user through allowing user inputs. The degree of control of the robotic device allotted to the user by the computing device 100 may vary within examples. In some instances, the user may have complete control of the robotic device. In others, the computing device and/or control system may retain some amount of control of the robotic device.

In an example implementation, after receiving some amount of control of robotic device 300, computing device 100 may control robotic device 300 using wireless communication other than NFC technology. As such, computing device 100 may actively switch wireless mediums to control robotic device 300 via Wi-Fi and/or some other wireless technology. Switching wireless technology may enable the computing device to preserve resources (e.g., battery power) and/or may enable the computing device to more efficiently control the robotic device.

For example, computing device 100 may establish the initial communication with the control system of one or more robotic devices through NFC technology, but may switch to other forms of wireless communication to control the robotic device(s). The other forms may permit the computing device to continue to control the robotic device(s) from distances that NFC may not enable.

In some examples, method 500 may further include detecting a second or subsequent gesture at the computing device, and based on detecting the second gesture at the computing device, providing a signal to the robotic device requesting for a control system of the robotic device to resume control of the robotic device. The second or subsequent gesture detected at the computing device (e.g., computing device 100) may differ or may be similar to the prior gesture (i.e., first gesture) previously detected indicating that the computing device should request at least partial control from the robotic device. The additional gesture may prevent the computing device from accidentally returning the control of the robotic device back to a control system. Similarly, the subsequent gesture(s) may also serve as a confirmation for the computing device 100 to recognize that the user no longer wants control of the robotic device.

In a further example implementation, the computing device may receive additional indications that one or more additional robotic devices are within the threshold distance to the computing device. As such, based on receiving multiple indications, the computing device may providing multiple alerts via the graphical interface of the computing device indicating that the user may select to control other robotic devices within the approximate location. Each alert may differ to enable the computing device clearly differentiate between robotic devices available possibly available for control by the computing device. The computing device may detect a selection of more than one alert and respond by transmitting signals to multiple robotic devices requesting at least partial control. That way, the computing device may engage in wireless control of multiple robotic devices.

In some example implementations, the computing device 100 may be configured to provide additional parameters and/or metrics associated with one or more robotic devices to the user. For example, the computing device 100 may receive some form of control of the robotic device and/or receive other information (e.g., parameters) associated with the robotic device to display on the graphical interface of the computing device 100. Information may include metrics associated with the robotic device, service data, and/or programming data, among other possible information.

Furthermore, in an example implementation, the computing device 100 may be configured to enable the user to control the robotic device through changing positions of the computing device. The IMU unit of the computing device may be configured to measure changes in orientation and position of the computing device to enable controlling the robotic device through motion controls.

In another example implementation, the computing device 100 may be configured to return control of a robotic device automatically when the computing device 100 is moved out of range of communication with the robotic device and/or control system of the robotic device. As such, the computing device 100 may be configured to enable the user to customize the range of communication that enables the computing device 100 to still control a robotic device. Additionally, the computing device 100 may be configured to retain control of a robotic device despite short drops in connectivity. For example, the computing device 100 may relinquish control upon detecting a drop in connectivity of control of a robotic device that exceeds a threshold time limit (e.g., 250 milliseconds). As such, the computing device 100 may require another detection of another gesture from a user prior to establishing control of the robotic device after the long drop in connectivity.

Figure 6:
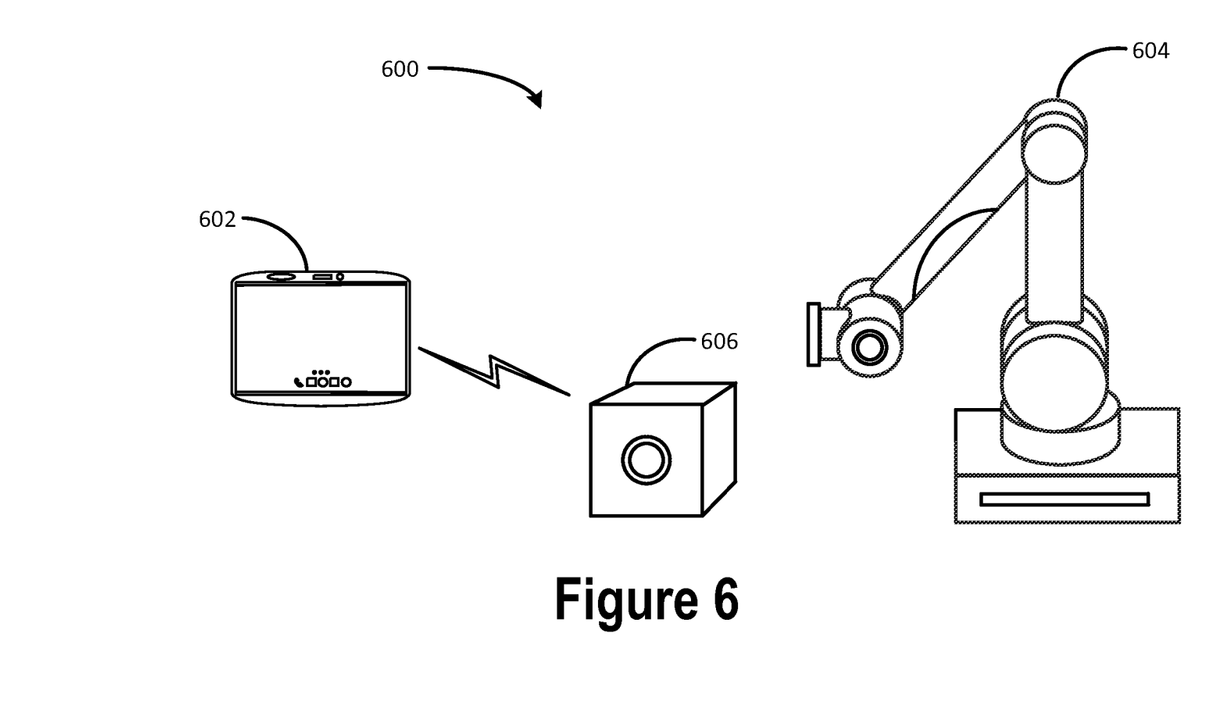
FIG. 6 shows an example scenario illustrating a computing device engaging in wireless control of a robotic device.

FIG. 6 shows an example scenario illustrating a computing device engaging in wireless control of a robotic device. The example scenario 600 includes computing device 602 engaging and possibly assuming some amount of control of robotic device 604 from control system 606. Scenario 600 is shown as one possible example, but other examples may exist. Furthermore, other examples may include more or less entities having more or less components.

Scenario 600 may represent a situation that involves a user using example computing device 602 to obtain control of robotic device 604, such as within a manufacturing environment. As such, the user may use computing device 602 to acquire temporary control of one or more robotic devices (e.g., robotic device 604). Similarly, scenario 600 may represent other possible scenarios, which may involve computing device inputting some form of control input to control system 606.

Computing device 602 may represent any type of device capable of communicating with control system 606. For example, computing device 602 may be computing device 100 shown in FIGS. 1-2. Similarly, robotic device 604 may represent any type of computing device and/or robotic device, such as robotic device 300. During operation, robotic device 604 may be configured to carry out various tasks. Furthermore, control system 606 may be configured to control one or more operations or other aspects of robotic device 604. Control system 606 is shown separate from robotic device 604, but may be configured physically together with robotic device 604. Furthermore, in some instances, control system 606 may merely represent one or more internal components of robotic device 604.

Example scenario 600 shows computing device 602 communicating with control system 606 via a wireless connection and possibly receiving some amount of control of robotic device 604. In some instances, computing device 602 may be communicating with control system 606 via NFC technology, which may occur as a result of computing device 602 detecting one or more gestures from a user. For example, computing device 602 may detect movement towards control system 606 in a predefined motion that signals that computing device 602 should take some amount of control of robotic device 604 from control system 606. In other examples, computing device 602 may require other inputs to signal that computing device 602 should attempt to receive and transfer some amount of control of robotic device 604 to the user. Computing device 602 may be further configured to assume some amount of control via NFC technology in response to being placed nearby control system 606, for example. In some examples, computing device 602 may be further configured to detect one or more gestures from the user prior to providing the control of robotic device 604 over to the user.

Example scenario 600 represents one possible example. Other examples scenarios may involve different computing devices and/or robotic devices as well as possibly more robotic devices.

Figure 7:
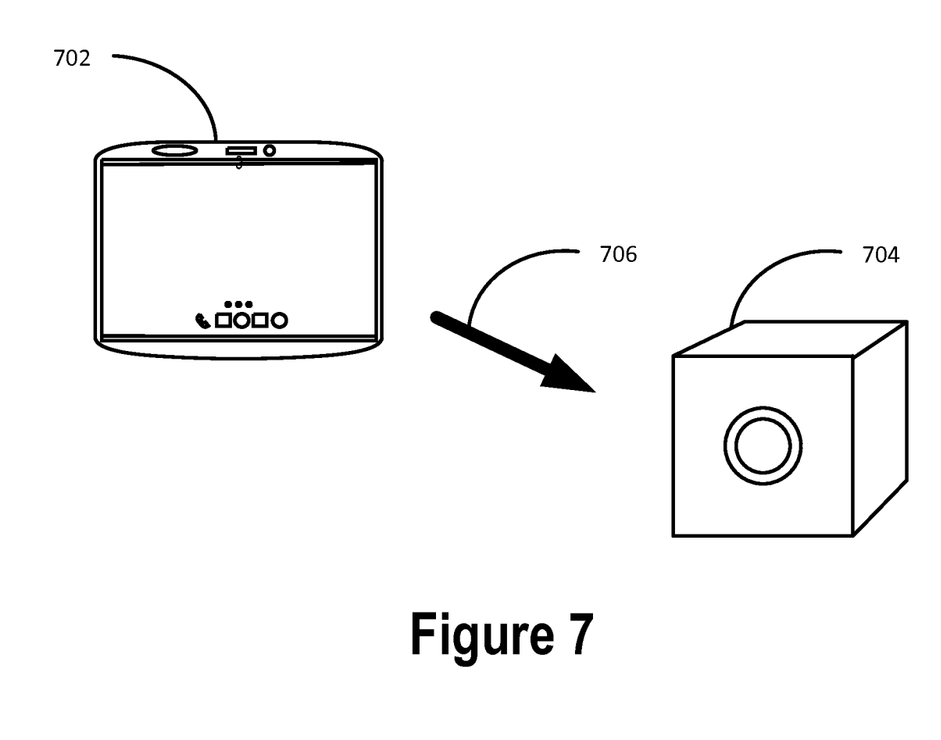
FIG. 7 illustrates a gesture that a computing device may detect, according to an example implementation.

FIG. 7 illustrates a gesture that a computing device may detect, according to an example implementation. In particular, computing device 702 is shown engaging control system 704 associated with a robotic device as a result of detecting a predefined motion 706.

As previously indicated above, computing device 702 may be configured to detect a gesture as one possible confirmation that signals computing device 702 should attempt to assume some form of control of the robotic device associated with control system 704. As shown, the predefined gesture 706 may be a motion towards control system 704, such as a straight line. In other examples, the predefined motion 706 may be a circularly, zig-zag, and/or other predefined motion. Computing device 702 may include one or more sensors, such as accelerometer(s) and/or gyroscope(s) configured to detect motions that the computing device 702 may be configured to use in the wireless control of a robotic device process. The predefined motions, such as predefined motion 706, may signal to the computing device 702 to initiate some communication with control system 704, and/or to provide some interface for the user to control the robotic device. Additionally, predefined motions that may be detected by various sensors of the computing device 702 may serve as a confirmation that the user wants to return control back to the control system 704, among other possible examples.

Figure 8:
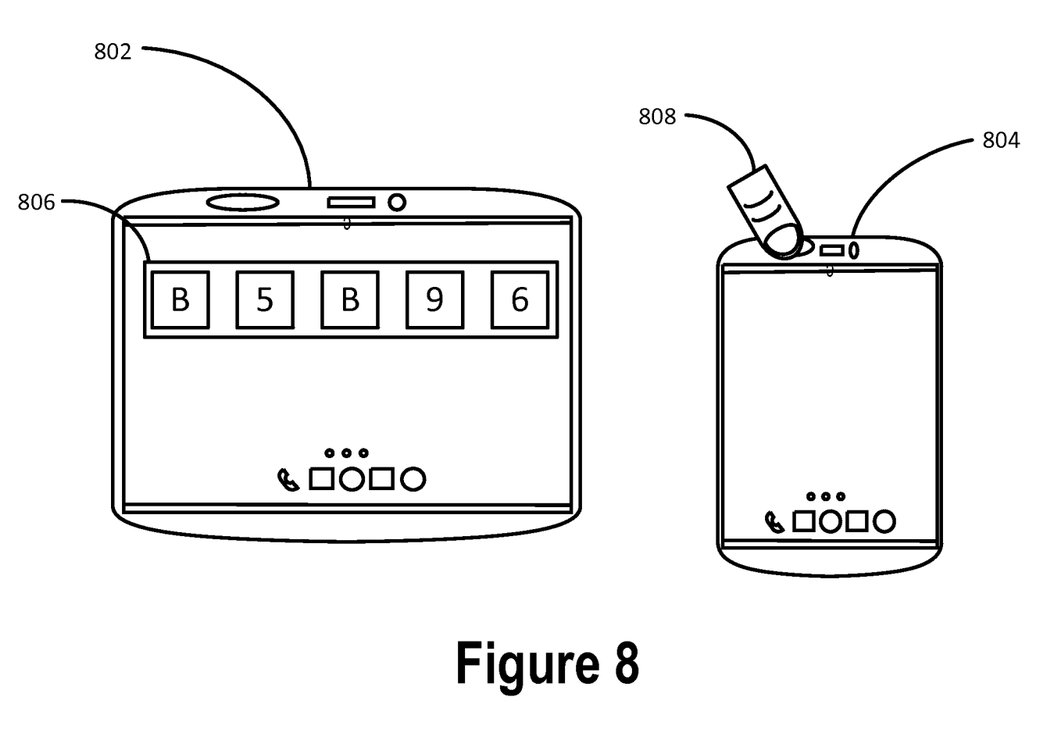
FIG. 8 illustrates computing devices receiving example gestures.

FIG. 8 illustrates computing devices receiving example gestures. Computing device 802 is shown receiving an alphanumeric passcode 806 and computing device 804 is shown receiving a biometric input 808. As previously indicated, an example computing device, such as computing devices 802-804, may be configured to detect and/or receive various types of gestures from a user. The different types of gestures may include passcodes, such as the alphanumeric passcode 806 shown on the graphical display of computing device 802, and/or biometric inputs, such as the fingerprint input (i.e., biometric input 808) detected by computing device 804 as shown in FIG. 8. Other types of gestures may be detected and/or received by example computing devices configured to engage in wireless control of one or more robotic devices.

The different gestures may be configured to provide a variety of information to an example computing device. For example, a computing device may detect a gesture as a signal to start a process relating to obtaining control of a robotic device. Similarly, the gesture may confirm to a computing device that a user is allowed to receive control of a robotic device. Additionally, in some instances, a gesture may represent a desire by the user to return some amount of control to the control system of a robotic device and/or signal to the computing device to return the control. In other examples, the gestures may represent other information for a computing device to use and process as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
    receiving, at a computing device, an indication that a robotic device is within a threshold distance to the computing device;
    based on receiving the indication that the robotic device is within the threshold distance to the computing device, providing an alert at the computing device that indicates that the computing device is capable of engaging in wireless communication with the robotic device;
    responsive to providing the alert at the computing device, detecting a gesture including a predefined motion of the computing device via one or more sensors of the computing device;
    based on detecting the gesture at the computing device and determining that the gesture includes the predefined motion, transmitting a signal requesting at least partial control of the robotic device to the robotic device; and responsive to receiving a response signal from the robotic device, engaging in control of one or more systems of the robotic device at the computing device.

2. The method of claim 1, wherein the gesture is a first gesture, and the method further comprises:

detecting a second gesture at the computing device; and based on detecting the second gesture at the computing device, providing a signal to the robotic device requesting for a control system of the robotic device to resume control of the robotic device.

3. The method of claim 2, wherein the second gesture differs from the first gesture.

4. The method of claim 1, wherein the one or more sensors includes an accelerometer.

5. The method of claim 1, wherein the gesture includes a passcode or biometric input.

6. The method of claim 1, wherein transmitting the signal requesting at least partial control of the robotic device to the robotic device comprises:

transmitting the signal via near field communication (NFC) technology.

7. The method of claim 1, wherein the alert is a first alert, and the method further comprises:

providing a second alert at the computing device that indicates that the computing device is capable of engaging in wireless communication with a second robotic device, wherein the second alert differs from the alert.

8. The method of claim 7, wherein detecting the gesture at the computing device further includes detecting a selection of both of the first alert and the second alert provided at the computing device, and the method further comprises:

based on the selection of both of the first alert and the second alert, transmitting a first signal requesting at least partial control of the robotic device to the robotic device and a second signal requesting at least partial control of the second robotic device to the second robotic device.

9. The method of claim 1, wherein receiving the response signal from the robotic device includes receiving an indication that the computing device received control of the at least partial control of the robotic device requested to the computing device.

10. A system comprising:

one or more processors; and a memory having stored thereon instructions that, upon execution by the one or more processors, cause the system to perform functions comprising:

receiving an indication that a robotic device is within a threshold distance to the system;

based on receiving the indication that the robotic device is within the threshold distance to the system, providing an alert that indicates that the one or more processors are capable of engaging in wireless communication with the robotic device;

responsive to providing the alert, detecting a gesture including a predefined motion of the system via one or more sensors of the system;

based on detecting the gesture and determining that the gesture includes the predefined motion, transmitting a signal requesting at least partial control of the robotic device to the robotic device; and responsive to receiving a response signal from the robotic device, engaging in control of one or more systems of the robotic device.

11. The system of claim 10, wherein the gesture is a first gesture, and the functions further comprise:

detecting a second gesture; and based on detecting the second gesture, providing a signal to the robotic device requesting for a control system of the robotic device to resume control of the robotic device.

12. The system of claim 10, wherein providing the alert includes:

providing at least one of an audio alert, a visual alert, or a vibration alert.

13. The system of claim 10, wherein the function of transmitting the signal requesting at least partial control of the robotic device to the robotic device comprises:

transmitting the signal wirelessly via near field communication (NFC) technology.

14. The system of claim 10, wherein the function of engaging in control of one or more systems of the robotic device comprises:

controlling the robotic device using wireless communication technology other than near field communication (NFC) technology.

15. A non-transitory computer readable medium having stored therein instructions, that when executed by a computing device, cause the computing device to perform functions comprising:

receiving an indication that a robotic device is within a threshold distance to the computing device;

based on receiving the indication that the robotic device is within the threshold distance to the computing device, providing an alert that indicates that the computing device is capable of engaging in wireless communication with the robotic device;

responsive to providing the, detecting a gesture including a predefined motion of the computing device via one or more sensors of the computing device;

based on detecting the gesture and determining that the gesture includes the predefined motion, transmitting a signal requesting at least partial control of the robotic device to the robotic device; and responsive to receiving a response signal from the robotic device, engaging in control of one or more systems of the robotic device.

16. The non-transitory computer readable medium of claim 15, wherein the gesture includes a passcode or biometric input.

17. The non-transitory computer readable medium of claim 15, wherein the one or more sensors includes an accelerometer.

18. The non-transitory computer readable medium of claim 15, wherein the gesture is a first gesture, and the functions further comprise:

detecting a second gesture; and based on detecting the second gesture, providing a signal to the robotic device requesting for a control system of the robotic device to resume control of the robotic device.

19. The non-transitory computer readable medium of claim 18, wherein the second gesture is the same as the first gesture.

* * * * *